US00RE43363E

(19) United States
(12) Reissued Patent
Semple et al.

(10) Patent Number: US RE43,363 E
(45) Date of Reissued Patent: May 8, 2012

(54) ABRASION RESISTANT PUMP THRUST BEARING

(75) Inventors: Ryan P. Semple, Owasso, OK (US); Robert C. de Long, Owasso, OK (US); Christopher Brunner, Owasso, OK (US); Arturo L. Poretti, Claremore, OK (US); Terry W. Shafer, Broken Arrow, OK (US)

(73) Assignee: Baker Hughes Incorporated, Houston, TX (US)

(21) Appl. No.: 13/077,663

(22) Filed: Mar. 31, 2011

Related U.S. Patent Documents

Reissue of:
(64) Patent No.: 7,575,413
Issued: Aug. 18, 2009
Appl. No.: 11/372,616
Filed: Mar. 10, 2006

U.S. Applications:
(60) Provisional application No. 60/660,737, filed on Mar. 11, 2005.

(51) Int. Cl.
*F01D 3/00* (2006.01)
*F01D 25/16* (2006.01)
*F04D 29/04* (2006.01)

(52) U.S. Cl. ..... 415/107; 415/229; 384/275; 384/420

(58) Field of Classification Search ..... 384/275, 384/295, 303, 420; 415/104, 107, 229
See application file for complete search history.

(56) References Cited

U.S. PATENT DOCUMENTS

| | | | |
|---|---|---|---|
| 4,175,806 | A | 11/1979 | Taylor |
| 4,511,307 | A | 4/1985 | Drake |
| 4,678,399 | A | 7/1987 | Vandevier et al. |
| 4,741,668 | A | 5/1988 | Bearden |
| 4,781,531 | A | 11/1988 | James |
| 4,838,758 | A | 6/1989 | Sheth |
| 4,872,808 | A | 10/1989 | Wilson |
| 5,033,937 | A | 7/1991 | Wilson |
| 5,160,240 | A | 11/1992 | Wilson |
| 5,722,812 | A | 3/1998 | Knox et al. |
| 5,827,042 | A | 10/1998 | Ramsay |
| 6,012,898 | A | 1/2000 | Nakamura et al. |
| 6,012,900 | A | 1/2000 | Kennedy et al. |
| 6,068,444 | A | 5/2000 | Sheth |
| 6,106,224 | A | 8/2000 | Sheth et al. |
| 6,167,965 | B1 | 1/2001 | Bearden et al. |
| 6,375,412 | B1 | 4/2002 | Dial |
| 6,554,474 | B2 | 4/2003 | Saito et al. |
| 6,743,001 | B2 | 6/2004 | Iwanari et al. |
| 6,899,517 | B2 | 5/2005 | Gay et al. |

*Primary Examiner* — Justine Yu
*Assistant Examiner* — Sean J Younger
(74) *Attorney, Agent, or Firm* — Bracewell & Giuliani LLP

(57) ABSTRACT

A centrifugal pump has a stationary diffuser with a bore. A thrust bearing has a tubular portion that inserts into the bore. The thrust bearing has an external shoulder that contacts a support surface in the bore of the diffuser for transmitting downward thrust from an upstream impeller to the diffuser. The thrust bearing has an internal shoulder for transmitting upward thrust from a downstream impeller to the diffuser.

18 Claims, 2 Drawing Sheets

ABRASION RESISTANT PUMP THRUST BEARING

Matter enclosed in heavy brackets [ ] appears in the original patent but forms no part of this reissue specification; matter printed in italics indicates the additions made by reissue.

CROSS REFERENCE TO RELATED APPLICATION

This application claims priority to provisional application 60/660,737, filed Mar. 11, 2005.

FIELD OF THE INVENTION

This invention relates in general to electrical submersible well pumps and in particular to thrust bearings for a centrifugal pump.

BACKGROUND OF THE INVENTION

Centrifugal well pumps are commonly used for pumping oil and water from oil wells. The pumps have a large number of stages, each stage having a stationary diffuser and a rotating impeller. The rotating impellers exert a downward thrust as the fluid moves upward. Also, particularly at startup and when the fluid flow is nonuniform, the impellers may exert upward thrust. In the most common pump design, the impellers float freely on the shaft so that each impeller transfers downward thrust to one of the diffusers. A thrust washer or bearing is located between a portion of each impeller and the upstream diffuser to accommodate the downward thrust. Another thrust washer transfers upward thrust.

Some wells produce abrasive materials, such as sand, along with the oil. The abrasive material causes wear of the pump components, particularly in the areas where downward thrust and upward thrust are transferred. Tungsten carbide thrust bearings and bearing sleeves may be employed in these pumps to reduce wear. A number of designs for these components exist, but improvements are desirable.

SUMMARY OF THE INVENTION

The centrifugal pump stage of this invention has a stationary diffuser having a bore. A thrust bearing has an tubular portion that inserts into the bore. An external shoulder extends radially outward from the tubular portion and bears against a support surface formed in the bore of the diffuser for transmitting downward thrust from an upstream impeller to the diffuser. An internal shoulder extends inward from the tubular portion for transmitting upward thrust from a downstream impeller to the diffuser.

A thrust runner rotatably engages a downstream end of the thrust bearing for transmitting the downward thrust from the upstream impeller to the diffuser. The thrust runner has an upstream end with a greater surface area than a downstream end. The thrust bearing has a downstream end that has a radial width substantially equal to a difference between an outer diameter of the external shoulder less an inner diameter of the internal shoulder. The thrust bearing and thrust washer are preferably constructed of hard wear resistant materials, such as tungsten carbide.

DETAILED DESCRIPTION OF THE INVENTION

Figure 2:
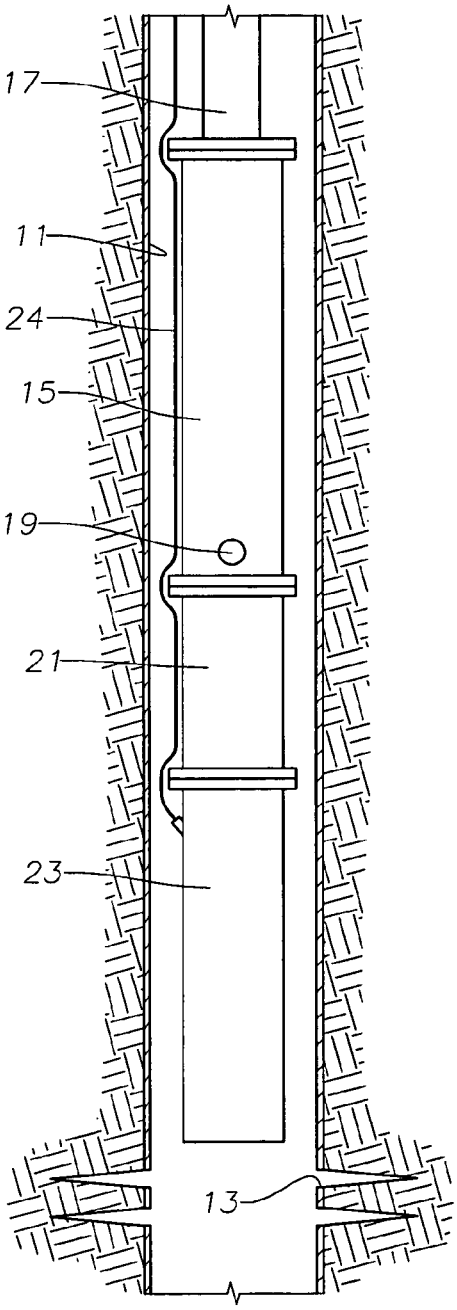
FIG. 2 is a schematic elevational view of the pump in accordance with this invention and shown within a well.
Figure 3:
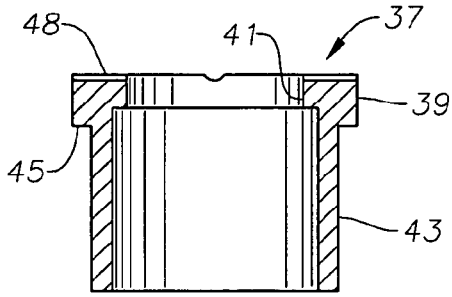
FIG. 3 is a sectional view of a thrust bearing of the pump stage of FIG. 1, shown removed from the pump.

Referring to FIG. 2, a pump assembly is shown in a well having a casing 11. Perforations 13 within casing 11 allow well fluid to flow into the casing 11. An electrical submersible pump 15 is shown suspended in the well on a string of production tubing 17. Pump 15 has an intake 19 for drawing in well fluid and pumping it through tubing 17 to the surface. Alternately, in some instances pump 15 will discharge into casing 11 above a packer (not shown).

Pump 15 has a seal section 21 connected to its lower end. An electrical motor 23 connects to the lower end of seal section 21. Seal section 21 reduces a pressure differential between lubricant within motor 23 and the hydrostatic pressure in the well. An electrical power cable 24 extends downward from the surface to motor 23 for supplying power.

Figure 1:
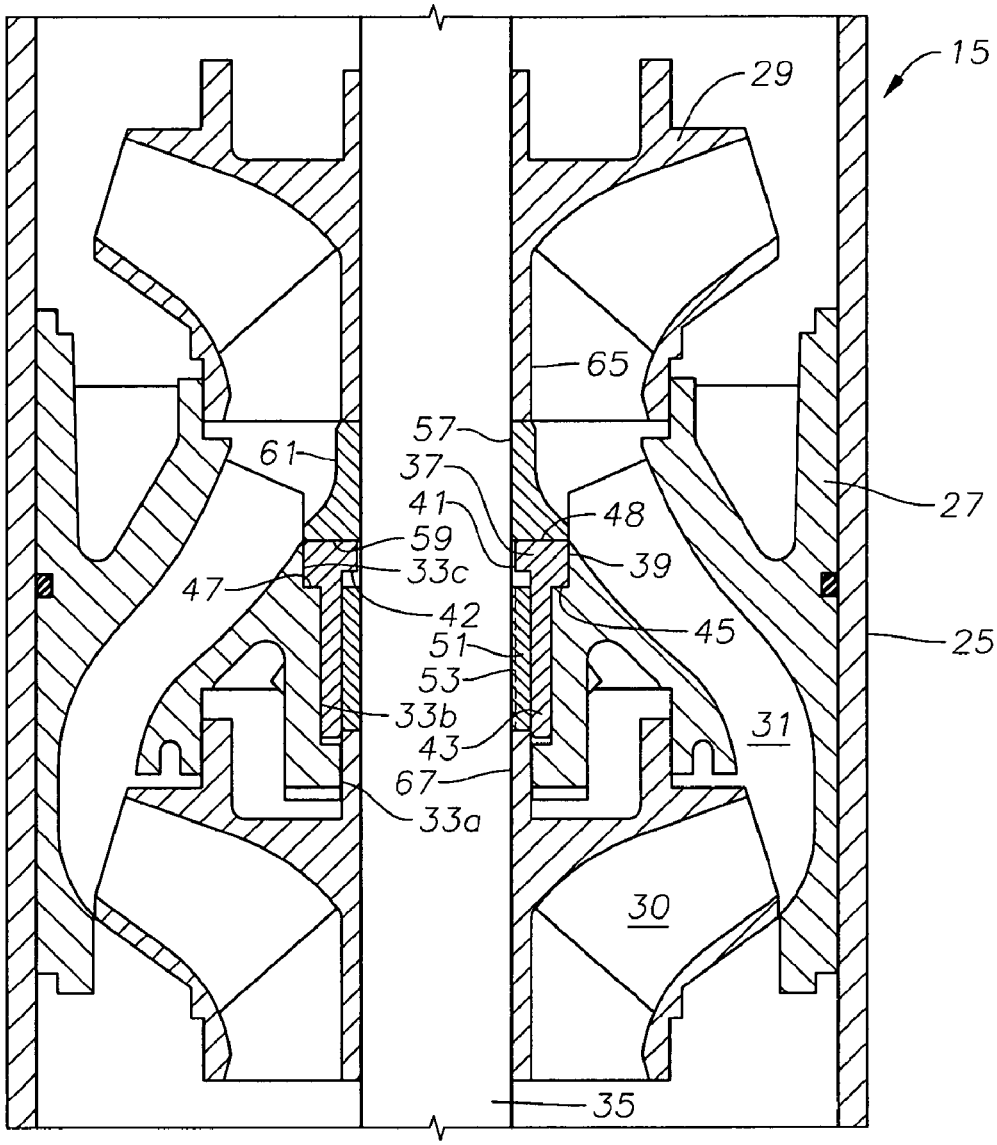
FIG. 1 is a sectional view of a stage of a pump constructed in accordance with this invention.
Figure 6:
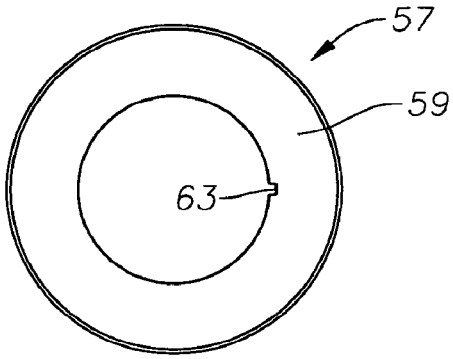
FIG. 6 is a bottom view of the thrust runner of FIG. 5.

Referring to FIG. 1, pump 15 is a centrifugal pump made up of a plurality of stages. Each stage has a diffuser 27 (one shown) and an impeller 29 (two shown). Each impeller rotates and has passages 30 that lead upward and outward from a lower inlet. Diffusers 27 stack on top of each other within a cylindrical housing 25. Diffusers 27 are non-rotatable relative to housing 25. Each diffuser 27 has a plurality of passages 31 that extend from a lower or upstream inlet to an upper or downstream outlet. The inlet is farther radially from a longitudinal axis of pump 15 than the outlet. In this embodiment, diffuser 27 is a mixed flow type, wherein passages 31 extend both radially inward and upward. This invention is applicable also to radial flow types, wherein the passages of the diffuser are primarily radial.

Diffuser 27 has an axial bore with a lower portion 33a, a central portion 33b, and an upper portion 33c. The terms "upper" and "lower" are used herein for convenience only and not in a limiting manner. Lower portion 33a has the smallest diameter, while central portion 33b is intermediate in inner diameter, and upper portion 37c is a counterbore with the largest diameter. In this embodiment, central portion 33b has a greater length than either upper or lower portions 33a or 33b.

A shaft 35 extends rotatably through diffuser bore portions 33a, 33b and 33c for rotating impellers 29. A thrust bearing 37 is non-rotatably mounted in portions 33b and 33c, such as by an interference fit or other means. Thrust bearing 37 is a tubular member having a cylindrical base 43 and an external rim 39 on an upper end of base 43. External rim 39 has a side wall that is in contact with upper bore portion 33c. Preferably, thrust bearing 37 has an internal rim 41 that extends radially inward into close proximity, but not touching shaft 35. Internal rim 41 has an inner diameter that is smaller than an inner diameter of base 43, defining an upstream facing internal shoulder 42 at the intersection of internal rim 41 and base 43. Internal shoulder 42 is located in a plane perpendicular to the axis of shaft 35, thus extends radially inward from base 43.

Base 43 has an outer cylindrical surface that contacts central bore portion 33b. The outer diameter of base 43 is less than the outer diameter of external rim 39, defining an upstream facing external shoulder 45. External shoulder 45 is in a plane parallel with but axially offset from internal shoulder 42. Internal and external shoulders 42, 45 define a generally I-shaped configuration for the downstream portion of thrust bearing 37. External shoulder 45 is in contact with a downstream facing support shoulder 47 formed at the junction between central bore portion 33b and upper bore portion 33c. The inner cylindrical surface of base 43 has an inner diameter approximately the same as the inner diameter of lower bore portion 33a. The lower end of base 43 terminates a short distance above the intersection of lower bore portion 33a with central bore portion 33b in this embodiment. A shoulder is located at the intersection of lower bore portion 33a and central bore portion 33b, and the lower end of base 43 is spaced from this shoulder by a clearance. Internal and external shoulders 42, 45 are located much closer to the downstream end of thrust bearing 37 than the upstream end.

Figure 4:
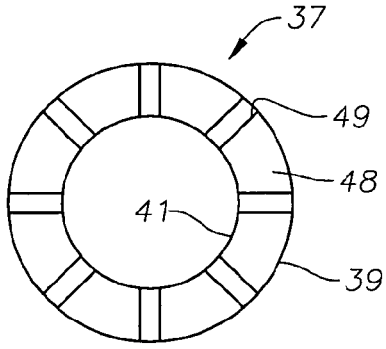
FIG. 4 is top plan view of the thrust bearing of FIG. 3.

The upper end of thrust bearing 37 terminates substantially flush with the outlet of passages 31. A flat thrust face 48 is formed on the upper end of thrust bearing 37, extending from internal rim 41 to external rim 39. As shown in FIG. 4, face 48 optionally may contain a plurality of shallow radial grooves 47 to assist in lubrication. Face 48 has a greater transverse cross-sectional area than base 43, measured from internal rim 41 to external rim 39. The cross-sectional area of face 48 is equivalent to the difference between the outer diameter of external shoulder 45 less the inner diameter of internal shoulder 42. In this embodiment, internal shoulder 42 is closer than external shoulder 45 to thrust face 48.

Figure 7:
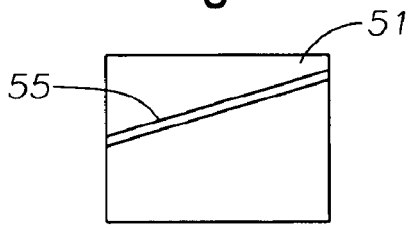
FIG. 7 is a side elevational view of a sleeve of the pump stage of FIG. 1, shown removed from the pump.

Preferably, a cylindrical sleeve 51 locates between the inner diameter of thrust bearing base 43 and shaft 35. Sleeve 51 has an axial key slot 53 for receiving a key (not shown) to cause sleeve 51 to rotate with shaft 35. Sleeve 51 is free to move axially on shaft 35 a limited distance. The outer diameter of sleeve 51 is in sliding contact with the inner diameter of thrust bearing base 43. In this embodiment, the axial length of sleeve 51 is less than the axial length of thrust bearing base 43. As illustrated in FIG. 7, a spiral groove 55 may be located on the exterior of sleeve 51 for facilitating in lubrication. Alternately, groove 55 could be formed in the inner diameter of base 43.

Figure 5:
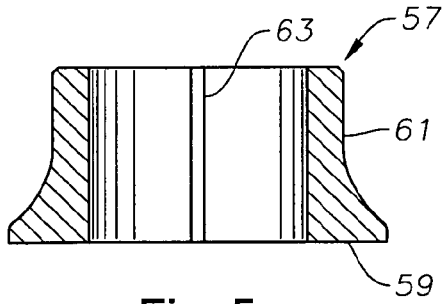
FIG. 5 is a sectional view of a thrust runner of the pump stage of FIG. 1, shown removed from the pump.

A thrust runner 57 has a downward facing smooth, flat thrust face 59 that engages thrust face 48 of thrust bearing 37. Thrust runner 57 has an exterior sidewall 61 that extends upward and inward from face 59. The exterior of sidewall 61 is a curved tapered surface in this embodiment, with a larger outer diameter at face 59 than at the upper end of thrust runner 57. The radial width and cross-sectional area of thrust runner face 59 is substantially the same as the radial width and cross-sectional area of thrust bearing face 48. The surface area of thrust runner face 59 is the same as the surface area of thrust bearing face 48 plus the area of grooves 49. An internal key slot 63 (FIG. 5) in thrust runner 57 receives a key to cause rotation of thrust runner 57.

A downward extending impeller hub 65 of the adjacent downstream impeller 29 or a spacer (not shown) if used, contacts the upper end of thrust runner 61. The adjacent upstream impeller 29 has an upward extending hub 67 that fits within lower bore portion 33a and a small portion of thrust bearing base 43. Hub 67 of upstream impeller 29 contacts the lower end of sleeve 51. During normal operation, a clearance is located between the upper end of sleeve 51 and internal shoulder 42 of thrust bearing 37.

Thrust bearing 37, sleeve 51 and thrust runner 57 are constructed of a harder material than the material of diffusers 27 and impellers 29. Preferably, the material comprises a carbide, such as tungsten carbide.

In operation, motor 23 (FIG. 2) rotates shaft 35 (FIG. 1), which in turn causes impellers 29, thrust runner 57 and sleeve 51 to rotate. The rotation of impellers 29 causes fluid to flow through impeller passages 30 and diffuser passages 31. The fluid pressure of the flowing fluid increases with each pump stage. Impellers 29 are keyed to shaft 35 for rotation, but not fixed to shaft 35 axially. Downward thrust exerted by the pumping action is applied to each impeller 29. The lower end of hub 65 of impeller 29 transmits the thrust through thrust runner 57 into the stationary thrust bearing 37. The thrust transfers through diffuser 27 to the diffuser (not shown) located below it, and eventually to the lower end of pump housing 25.

Under some circumstances, up thrust occurs, causing hub 67 of upstream impeller 29 to apply upward thrust to sleeve 51. Sleeve 51 moves upward into contact with internal shoulder 42. The upward force transfers from internal shoulder 42 through thrust bearing 37, diffuser 27 and into housing 25.

If desired, each stage could have one of the thrust bearings 37, thrust runners 57, and sleeve 51. Alternately, some of the stages could be of conventional type, not having a thrust runner, thrust bearing, or sleeve as described. Spacer sleeves between the impeller hubs of these conventional stages could transfer thrust downward to the next stage having a thrust runner and thrust bearing as described.

The invention has significant advantages. The thrust bearing transfers both downward and upward thrust to the diffuser. The thrust faces are considerably larger in cross-sectional area than the tubular portions of the thrust bearing and thrust runner.

While the invention has been shown in only one of its forms, it shoulder be apparent to those skilled in the art that it is not so limited but is susceptible to various changes without departing from the scope of the invention.

We claim:

1. A centrifugal pump, comprising:

a stationary diffuser having a bore with a support shoulder formed therein;

a stationary thrust bearing having a tubular portion inserted into the bore of the diffuser;

an upstream facing external shoulder on the tubular portion that contacts the support shoulder in the diffuser to transfer downward thrust from a downstream impeller to the diffuser;

an upstream facing internal shoulder on the tubular portion to transfer upward thrust from an upstream impeller to the diffuser; and a thrust runner having a downstream end for engagement with the downstream impeller and an upstream end that rotatably engages a downstream end of the thrust bearing, the upstream end of the thrust runner having a radial width substantially equal to a difference between an outer radius of the external shoulder less an inner radius of the internal shoulder.

2. The centrifugal pump according to claim 1, wherein the internal and external shoulders are located closer to a downstream end of the thrust bearing than to an upstream end of the thrust bearing.

3. The centrifugal pump according to claim 1, wherein the internal shoulder of the thrust bearing is closer than the external shoulder to a downstream end of the thrust bearing.

4. The centrifugal pump according to claim 1, wherein the upstream end of the thrust runner has a cross-sectional area greater than the downstream end of the thrust runner.

5. The centrifugal pump according to claim 1, wherein the thrust bearing has a thrust face that extends from an outer diameter of the external shoulder to an inner diameter of the internal shoulder.

6. A centrifugal pump, comprising:

a stationary diffuser having a bore with a support shoulder formed therein;

a stationary thrust bearing secured to the diffuser, the thrust bearing having a tubular portion with a downstream end that has a generally I-shaped cross-section, defining an upstream facing external shoulder extending radially outward from the tubular portion and an upstream facing internal shoulder extending radially inward from the tubular portion;

a downstream facing thrust face on a downstream end of the thrust bearing, the thrust face having a radial width substantially equal to a difference between an outer radius of the external shoulder less an inner radius of the internal shoulder;

a thrust runner that rotatably engages the thrust face of the thrust bearing for transmitting downward thrust from [an upstream] *a downstream* impeller to the thrust bearing;

the external shoulder contacting the support shoulder in the bore of the diffuser for transmitting the downward thrust from the thrust runner to the diffuser, and the internal shoulder being positioned for transmitting upward thrust from an upstream impeller to the diffuser.

7. The centrifugal pump according to claim 6, wherein the thrust runner has a downstream end with a cross-sectional area smaller than the cross-sectional area of the upstream end of the thrust runner.

8. The centrifugal pump according to claim 6, wherein the internal shoulder of the thrust bearing is closer than the external shoulder to a downstream end of the thrust bearing.

9. A centrifugal pump, comprising:

a stationary diffuser having a bore;

an upstream impeller in rotatable engagement with an upstream portion of the diffuser, and a downstream impeller in rotatable engagement with a downstream portion of the diffuser, each of the impellers having a central hub containing a bore;

a shaft extending through the bores of the diffuser and impellers for rotating the impellers;

a support shoulder in the bore of the diffuser;

a thrust bearing having a tubular base that is secured stationarily within the bore of the diffuser;

an upstream facing external shoulder extending externally from the base of the thrust bearing that contacts and is supported by the support shoulder in the diffuser for transmitting downward thrust imposed on the thrust bearing to the diffuser;

an upstream facing internal shoulder extending internally from the base of the thrust bearing;

a sleeve extending within the base between the hub of the upstream impeller and the internal shoulder in the thrust bearing for transmitting upward thrust from the upstream impeller to the thrust bearing and the diffuser;

a thrust face on a downstream end of the thrust bearing; and a thrust runner carried on the shaft and extending between the hub of the downstream impeller and the thrust face of the thrust bearing for axial movement relative to the shaft and rotational movement therewith for transmitting downward thrust from the [upstream] *downstream* impeller to the thrust bearing.

10. The centrifugal pump of claim 9, wherein the thrust runner has an upstream end that has a greater surface area than a downstream end.

11. The centrifugal pump of claim 9, wherein the thrust runner has an upstream end that has a radial width substantially equal to a difference between an outer radius of the external shoulder less an inner radius of the internal shoulder of the thrust bearing.

12. The centrifugal pump of claim 9, wherein the thrust face of the thrust bearing has a larger cross-sectional area than a cross-sectional area of the base of the thrust bearing.

13. The centrifugal pump according to claim 9, wherein the thrust face of the thrust bearing has a cross-sectional area substantially equal to a cross-sectional area of the upstream end of the thrust runner.

14. The centrifugal pump according to claim 9, wherein the internal and external shoulders of the thrust bearing are closer to the thrust face than to an upstream end of the thrust bearing.

15. The centrifugal pump according to claim 9, wherein the internal shoulder of the thrust bearing is closer than the external shoulder to the thrust face.

16. The centrifugal pump according to claim 9, further comprising an upward facing shoulder in the bore of the diffuser, the upward facing shoulder being upstream of the support shoulder in the diffuser, and the base of the thrust bearing having an upstream end spaced from the upward facing shoulder by a clearance.

17. The centrifugal pump according to claim 9, further comprising a spiral groove between the sleeve and the base for assisting in lubrication.

18. The centrifugal pump according to claim 9, further comprising a spiral groove on an outer diameter of the sleeve for assisting in lubrication.

* * * * *